(12) United States Patent
Holmquist

(10) Patent No.: US 9,721,389 B2
(45) Date of Patent: Aug. 1, 2017

(54) 3-DIMENSIONAL AUGMENTED REALITY MARKERS

(71) Applicant: Yahoo! Inc., Sunnyvale, CA (US)

(72) Inventor: Lars Erik Holmquist, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 14/195,668

(22) Filed: Mar. 3, 2014

(65) Prior Publication Data

US 2015/0248785 A1    Sep. 3, 2015

(51) Int. Cl.
*G06T 19/00* (2011.01)
*G06T 7/00* (2017.01)

(52) U.S. Cl.
CPC .......... *G06T 19/006* (2013.01); *G06T 7/0044* (2013.01); *G06T 2207/30204* (2013.01)

(58) Field of Classification Search
CPC ..... G06T 19/006; G06T 19/00; G06T 7/0044; G06T 2207/30204; G06F 3/011
See application file for complete search history.

(56) References Cited

U.S. PATENT DOCUMENTS

| | | | | |
|---|---|---|---|---|
| 6,560,476 | B1* | 5/2003 | Pelletier et al. | 600/410 |
| 2003/0210812 | A1* | 11/2003 | Khamene et al. | 382/128 |
| 2008/0119727 | A1* | 5/2008 | Barbagli et al. | 600/424 |
| 2011/0090343 | A1* | 4/2011 | Alt et al. | 348/164 |
| 2012/0062595 | A1* | 3/2012 | Oh et al. | 345/633 |
| 2012/0108332 | A1* | 5/2012 | Baseley et al. | 463/31 |
| 2013/0057642 | A1* | 3/2013 | Catchpole | 348/14.08 |
| 2013/0324839 | A1* | 12/2013 | Chien | 600/424 |
| 2014/0015860 | A1* | 1/2014 | Kim et al. | 345/633 |

OTHER PUBLICATIONS

Wikipedia, "Augmented Reality," Mar. 1, 2014., downloaded from http://en.wikipedia.org/wiki/Augmented_reality.
Dartmouth College Library Research Guides, "Augmented Reality," Apr. 18, 2013, downloaded from http://researchguides.dartmouth.edu/content.php?pid=227212&sid=1891183.
Robo realm—vision for machines, "Microsoft Kinect," © 2005-2014, downloaded from http://www.roborealm.com/help/Microsoft_Kinect.php.
Wikipedia, "ARToolKit," Feb. 25, 2014, downloaded from http://en.wikipedia.org/wiki/ARToolikit.
Sony CSL—Research Gallery, "CyberCode," © 1993-2014, downloaded from http://www.sonycsl.co.jp/en/research_gallery/cybercode.html.

(Continued)

*Primary Examiner* — Tapas Mazumder
(74) *Attorney, Agent, or Firm* — Weaver Austin Vileneuve & Sampson LLP

(57) ABSTRACT

In one embodiment, a first perspective of a three-dimensional marker may be detected, where the three-dimensional marker has a shape that presents a different appearance from every angle. A first three-dimensional virtual overlay corresponding to the first perspective of the three-dimensional marker may be identified or generated. The first three-dimensional virtual overlay corresponding to the first perspective of the three-dimensional marker may be projected or displayed such that the first three-dimensional virtual overlay substantially covers the first perspective of the three-dimensional marker.

22 Claims, 8 Drawing Sheets

(56) References Cited

OTHER PUBLICATIONS

Handheld Augmented Reality—Christian Doppler Laboratory, "Studierstube Tracker," Aug. 2, 2011, downloaded from http://handheldar.icg.tugraz.at/stbtracker.php.
Roberto Baldwin, "Ikea's Augmented Reality Catalog Will Let You Peek Inside Furniture," Jul. 20, 2012, downloaded from http://www.wired.com/gadgetlab/2012/07/ikeas-augmented-reality-catalog-lets-you-peek-inside-the-malm/.

* cited by examiner

3-DIMENSIONAL AUGMENTED REALITY MARKERS

BACKGROUND

The disclosed embodiments relate generally to three-dimensional augmented reality markers, as well as methods and apparatus for implementing augmented reality via three-dimensional augmented reality markers.

Augmented reality is a live, direct or indirect, view of a physical, real-world environment whose elements are augmented by computer-generated sensory input such as sound, video, graphics, or Geographical Positioning System (GPS) data. Therefore, augmented reality technology functions by enhancing one's current perception of reality.

Augmented reality technology often implements techniques for incorporating computer graphics into real-world environments. A crucial component of augmented reality is to accurately match overlaid graphics with a real-world scene. The most popular way to do this is using two-dimensional markers.

SUMMARY

The disclosed embodiments enable augmented reality to be implemented. This may be accomplished through the use of a three-dimensional marker.

In accordance with one embodiment, a three-dimensional marker may include a three-dimensional object, where the three-dimensional object has a shape that presents a different appearance from every angle. The three-dimensional object may operate as a three-dimensional marker capable of being detected by an augmented reality product, wherein the augmented reality product is configured to continuously project or display a three-dimensional virtual overlay that corresponds to a current perspective of the three-dimensional object such that the three-dimensional virtual overlay substantially covers the current perspective of the three-dimensional object.

In accordance with another embodiment, a first perspective of a three-dimensional marker may be detected, where the three-dimensional marker has a shape that presents a different appearance from every angle. A first three-dimensional virtual overlay corresponding to the first perspective of the three-dimensional marker may be identified or generated. The first three-dimensional virtual overlay corresponding to the first perspective of the three-dimensional marker may be projected or displayed such that the first three-dimensional virtual overlay substantially covers the first perspective of the three-dimensional marker.

Various embodiments may be implemented via a device comprising a processor, memory, and a display. The processor and memory are configured to perform one or more of the above described method operations. Other embodiments may be implemented via a computer readable storage medium having computer program instructions stored thereon that are arranged to perform one or more of the above described method operations.

These and other features and advantages of the disclosed embodiments will be presented in more detail in the following specification and the accompanying figures which illustrate by way of example the principles of the disclosed embodiments.

DETAILED DESCRIPTION OF THE SPECIFIC EMBODIMENTS

Figure 1:
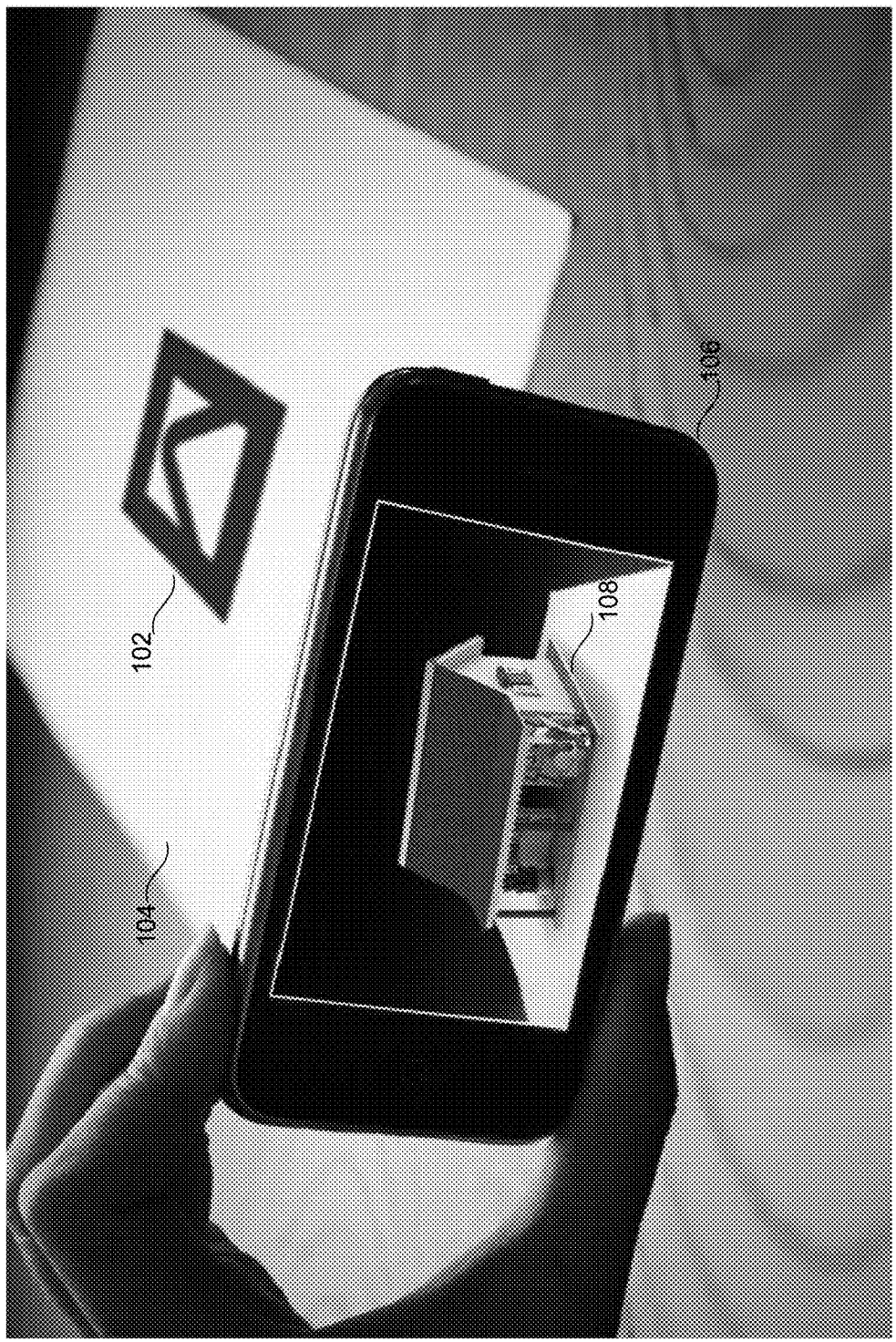
FIG. 1 is a diagram illustrating an example application of augmented reality using a two-dimensional marker.

Reference will now be made in detail to specific embodiments of the disclosure. Examples of these embodiments are illustrated in the accompanying drawings. While the disclosure will be described in conjunction with these specific embodiments, it will be understood that it is not intended to limit the disclosure to these embodiments. On the contrary, it is intended to cover alternatives, modifications, and equivalents as may be included within the spirit and scope of the disclosure as defined by the appended claims. In the following description, numerous specific details are set forth in order to provide a thorough understanding of the disclosure. The disclosed embodiments may be practiced without some or all of these specific details. In other instances, well known process operations have not been described in detail in order not to unnecessarily obscure the disclosure. The Detailed Description is not intended as an extensive or detailed discussion of known concepts, and as such, details that are known generally to those of ordinary skill in the relevant art may have been omitted or may be handled in summary fashion.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

A common way to implement augmented reality is through the use of two-dimensional markers. FIG. 1 is a diagram illustrating an example application of augmented reality using a two-dimensional marker. As shown in this example, a two-dimensional marker 102 is typically printed on paper 104 using a traditional paper printer. For example, the two-dimensional marker 102 may include a distinct code or geometrical pattern such as a checkered pattern.

When the two-dimensional marker 102 is viewed using a device 106 such as a handheld device implementing augmented reality functionality, the augmented reality product may map the two-dimensional marker 102 to a corresponding virtual object. The augmented reality product may then project the virtual object over the two-dimensional marker 102 via a display of the device 106. In this example, the two-dimensional marker 102 printed on the paper 104 is mapped to a virtual house, which is projected as a three-dimensional virtual overlay 108 via the display of the device 106. In this manner, a three-dimensional virtual overlay may be projected or otherwise displayed on top of a two-dimensional marker.

In many augmented reality applications, it may be desirable to provide the user the illusion that they are rotating or otherwise moving a virtual three-dimensional object. One common way to provide a fully manipulable virtual three-dimensional object is to create a small physical cube with a two-dimensional marker on each side. For example, a two-dimensional marker that has been printed on paper may be affixed to each side of the physical cube.

Figure 2:
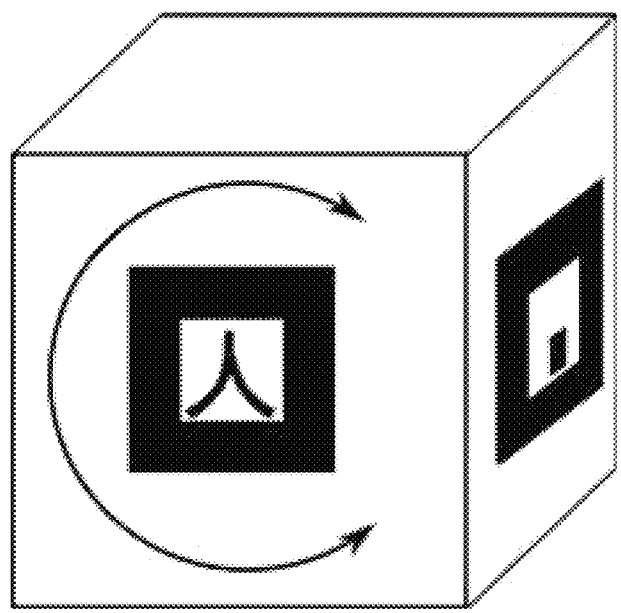
FIG. 2 is a diagram illustrating a physical cube having a two-dimensional marker on each side that may be used in augmented reality applications.

FIG. 2 is a diagram illustrating a physical cube having a two-dimensional marker on each side that may be used in augmented reality applications. A physical cube such as that shown in FIG. 2 will produce a realistic illusion when any of the cube's sides and its corresponding two-dimensional marker is viewed head on. However, when the cube is rotated, the two-dimensional markers will be visually distorted or occluded, and the tracking will be lost, resulting in jarring glitches in the presentation.

Traditional two-dimensional markers are efficient when the entire marker is clearly visible. More particularly, a camera of a device offering an augmented reality experience may track a two-dimensional marker. A virtual overlay may then be aligned with the two-dimensional marker and projected. However, if a two-dimensional marker is occluded or even at an angle, the tracking is lost and the scene being viewed is interrupted. As a result, tracking will generally be interrupted if the person holding or wearing the device is moving or the two-dimensional marker is moving. This makes it very difficult to present a realistic and manipulable virtual three-dimensional object using two-dimensional markers—even when the two-dimensional markers are affixed to a three-dimensional object such as a cube.

As will be described in further detail below, the disclosed embodiments enable a three-dimensional object to operate as a three-dimensional marker that presents a unique visual profile from every angle. Through the use of such a three-dimensional marker, three-dimensional virtual overlays may be presented in a continuous and uninterrupted manner. Accordingly, it is possible to provide a more realistic experience to users who are visualizing or manipulating three-dimensional virtual objects using three-dimensional markers.

The disclosed embodiments enable augmented reality to be implemented using a three-dimensional marker via an augmented reality product. More particularly, an augmented reality product may include computer-readable instructions for implementing augmented reality. In addition, an augmented reality product may include an apparatus that provides augmented reality functionality. In some embodiments, such an apparatus may include an augmented reality device that is specifically designed to provide an augmented reality experience. For example, an augmented reality device may include a wearable device such as glasses or goggles. In other embodiments, such an apparatus may include a portable (e.g., handheld) device implementing augmented reality functionality. Example portable devices include, but are not limited to, cellular telephones, smart phones, display pagers, radio frequency (RF) devices, infrared (IR) devices, Personal Digital Assistants (PDAs), handheld computers, tablet computers, laptop computers, and wearable computers.

An augmented reality product may be configured to continuously track a three-dimensional marker and continuously project a three-dimensional virtual overlay that corresponds to a current perspective of the three-dimensional object on top of the three-dimensional marker such that the three-dimensional virtual overlay substantially covers the current perspective of the three-dimensional marker. In this manner, the augmented reality product may provide a user a seamless illusion of handling a three-dimensional projected object in augmented reality without any of the associated glitches of earlier systems.

The three-dimensional virtual overlay may present a static three-dimensional image. Alternatively, the three-dimensional virtual overlay may include an animated three-dimensional virtual overlay.

Figure 3:
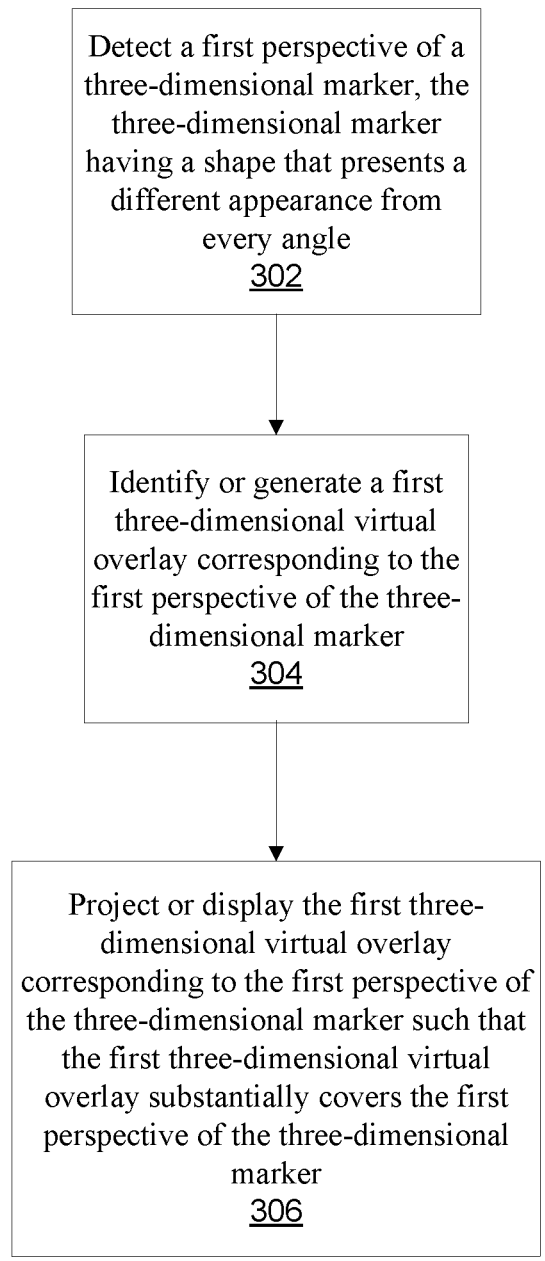
FIG. 3 is a process flow diagram illustrating an example method of implementing augmented reality using a three-dimensional marker.

FIG. 3 is a process flow diagram illustrating an example method of implementing augmented reality using a three-dimensional marker. A first (current) perspective of a three-dimensional marker may be detected at 302, where the three-dimensional marker has a shape that presents a different appearance from every angle. The perspective of the three-dimensional marker may correspond to a position of the three-dimensional marker in space (e.g., angle), as well as a distance of the three-dimensional marker from a device implementing augmented reality functionality.

A current perspective of the three-dimensional marker may be detected using a camera. In some embodiments, a visual method of detecting the current perspective of the three-dimensional marker may be performed by using a camera to generate a photograph, which indicates a shape of the three-dimensional marker from the current perspective. In other embodiments, the camera may include a depth-sensing camera. More particularly, the depth-sensing camera may generate a depth map corresponding to the current perspective of the three-dimensional marker. The depth map may indicate the shape of the three-dimensional marker, as well as a distance between the three-dimensional marker and a device implementing augmented reality functionality (which includes the depth-sensing camera). More particularly, it is possible to ascertain from lighted and shaded areas of the depth map a shape of the three-dimensional marker from the current perspective, as well as a distance between the three-dimensional marker and the device. Therefore, the current perspective of the three-dimensional marker may be detected based, at least in part, upon a photograph and/or depth map.

The current perspective of the three-dimensional marker may have a corresponding set of unique characteristics. The characteristics may indicate a unique physical shape of the three-dimensional marker, as perceived from the current perspective of the three-dimensional marker. More particularly, the set of unique characteristics may include a set of dimensions associated with the current perspective of the three-dimensional marker. For example, such characteristics may include an approximate width, approximate height, and/or approximate depth of various portions of the three-dimensional object, from the current perspective. In addition, the set of unique characteristics may further include colors or other two-dimensional designs on various external segments of the three-dimensional marker.

To detect the current perspective of the three-dimensional marker, one of the plurality of possible perspectives of the three-dimensional marker may be identified. In other words, the shape of the three-dimensional marker, as perceived from the current perspective, may be identified as correlating to a specific one of a plurality of possible perspectives of the three-dimensional marker.

A first three-dimensional virtual overlay corresponding to the first perspective of the three-dimensional marker may be identified or generated at 304. In some embodiments, the current perspective or associated characteristics may be compared to a stored set of data. Upon identifying the current perspective in the stored set of data, a corresponding three-dimensional virtual overlay may be identified. Such a comparison may be performed via various recognition methods. For example, a visual recognition method may compare a photograph against the stored set of data. As another example, a recognition method may include matching various features of a depth map against the stored set of data.

The stored set of data may relate a plurality of possible perspectives of the three-dimensional marker with corresponding three-dimensional virtual overlays. By identifying the current perspective of the three-dimensional marker as one of the plurality of possible perspectives of the three-dimensional marker, it is possible to quickly identify the corresponding three-dimensional virtual overlay.

The stored set of data may also relate the various perspectives of the three-dimensional marker with one another. By comparing the current perspective against the stored set of data, it is possible to ascertain which perspective of the three-dimensional marker is the current perspective. In other words, it is possible to ascertain which part of the three-dimensional marker is being viewed from the current perspective. As a result, it is possible to quickly identify the next perspective of the three-dimensional marker to which the three-dimensional marker is being rotated, enabling the next virtual three-dimensional overlay to be quickly identified. (e.g., as a user rotates the three-dimensional marker).

The stored set of data may include, for example, visual data (e.g., photographs), depth-maps, and/or numerical data (e.g., pertaining to the visual data or depth-maps). In addition, the stored set of data may include a computer aided design (CAD) model of the three-dimensional marker. Thus, the stored data may indicate dimensions of the three-dimensional marker, where only a subset of the dimensions may be perceived from a given perspective. In this manner, the set of data may indicate a shape of the three-dimensional marker.

The set of data may be stored locally at a device implementing augmented reality functionality. Alternatively, the set of data may be stored remotely (e.g., at a server of a network). In addition, the set of data may be stored such that various virtual overlays are statically associated with the various perspectives of the three-dimensional marker. Alternatively, the set of data may be dynamically identified or generated such that various virtual overlays are dynamically associated with the various perspectives of the three-dimensional marker. For example, the set of data may be dynamically identified or generated based, at least in part, upon a user profile of a user that is using the device.

The first three-dimensional virtual overlay corresponding to the first perspective of the three-dimensional marker may be projected, displayed or otherwise presented at 306 such that the first three-dimensional virtual overlay substantially covers the first perspective of the three-dimensional marker. For example, the first three-dimensional virtual overlay may be positioned such that outer boundaries of the virtual overlay are aligned with outer boundaries of the three-dimensional marker. In this manner, it is possible to quickly superimpose augmented reality graphics over a three-dimensional marker.

The three-dimensional marker may be continuously tracked. More particularly, the tracking of the three-dimensional marker may include periodically detecting a perspective of the three-dimensional marker such that steps 302-306 are performed periodically. Alternatively, the tracking of the three-dimensional marker may include detecting movement of the three-dimensional marker such that the steps 302-306 are performed after or in response to each movement of the three-dimensional marker. The movement may be a relative movement of the three-dimensional marker with respect to a device implementing augmented reality. In other words, it is possible that the device may be moving while the three-dimensional marker is stationary, resulting in a perceived movement of the three-dimensional marker by the device.

The movement may include a rotation of the three-dimensional marker with respect to one or more axes. As a result, a perspective of the three-dimensional marker that is detected may be from a different angle than a previous perspective. In addition, the movement may include a movement along one or more axes in any direction and for any amount of distance. The movement of the three-dimensional marker may result in a movement away from or closer to a user of an augmented reality product or device.

The process described above with respect to blocks 302-306 may be repeated for additional perspectives of the three-dimensional marker. For example, a second (current) perspective of the three-dimensional marker may be detected. Where the detection is performed on a periodic basis, the second perspective of the three-dimensional marker may be the same as or different from the first perspective of the three-dimensional marker. Alternatively, where the detection is performed in response to a change in the perspective of the three-dimensional marker, the second perspective of the three-dimensional marker will differ from the first perspective of the three-dimensional marker. A second three-dimensional virtual overlay corresponding to the second perspective of the three-dimensional marker may be identified or generated. The second three-dimensional virtual overlay corresponding to the second perspective of the three-dimensional marker may be projected, displayed or otherwise presented such that the second three-dimensional virtual overlay substantially covers the second perspective of the three-dimensional marker.

A user may choose to move a device implementing augmented reality functionality (e.g., by walking or manually moving the device) or move the three-dimensional marker (e.g., by manually moving the three-dimensional marker). Where there has been a movement of the device implementing augmented reality functionality or a movement of the three-dimensional marker, a change in perspective of the three-dimensional marker may be detected. As a result, the second perspective of the three-dimensional marker will be different from the first perspective of the three-dimensional marker. The first three-dimensional virtual overlay may represent a first object, while the second three-dimensional virtual overlay may represent a second object that is different from the first object. Alternatively, the first and second three-dimensional virtual overlays may represent two different perspectives of the same object.

Since the three-dimensional marker has a different appearance or depth signature from every angle, the three-dimensional marker will continuously have a different appearance or depth signature as the three-dimensional marker is rotated. Accordingly, it is possible to continuously track changes in perspective of the three-dimensional marker without disruption, resulting in a continuous projection of a three-dimensional virtual overlay.

Figure 4:
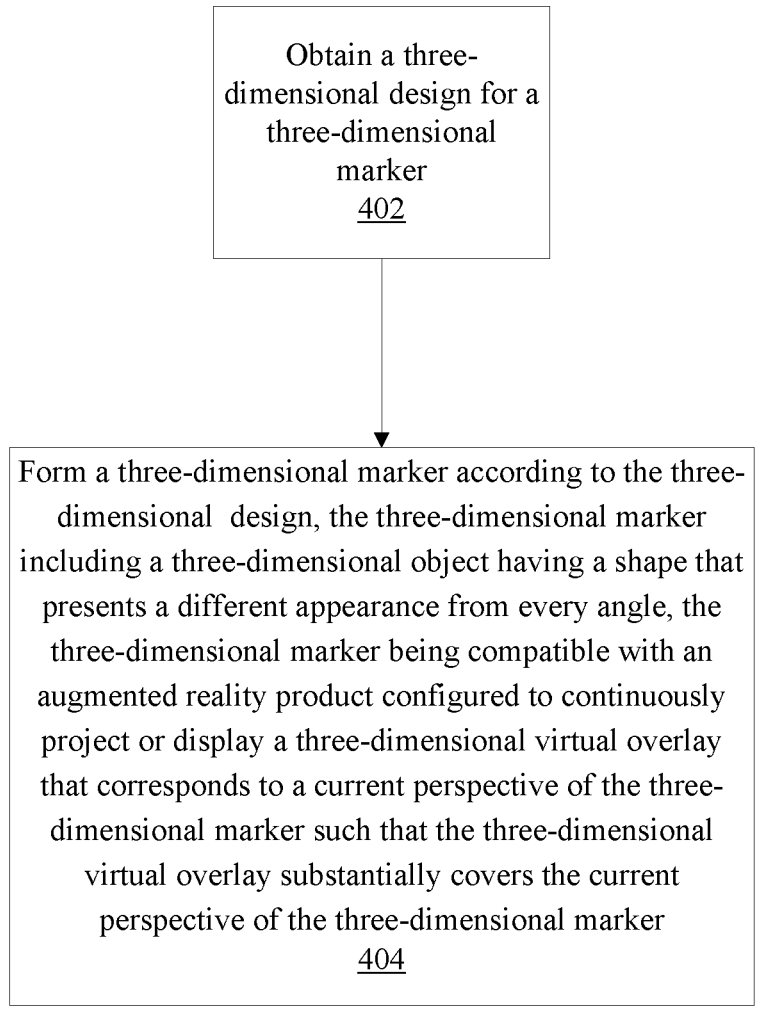
FIG. 4 is a process flow diagram illustrating an example method of making a three-dimensional marker for use with an augmented reality product.

FIG. 4 is a process flow diagram illustrating an example method of making a three-dimensional marker for use with an augmented reality product. A three-dimensional design for a three-dimensional marker may be obtained at 402. For example, a geometric algorithm may be used to calculate the three-dimensional design to ensure that a three-dimensional marker produced according to the design will provide a unique visual signature from every angle. Such a design may also ensure that any three-dimensional marker produced according to the design will also provide a unique depth signature from every angle.

A three-dimensional marker may be formed at 404 according to the three-dimensional design. More particularly, the three-dimensional marker may include a three-dimensional object having a shape that presents a different appearance from every angle. In addition, the three-dimensional marker may be compatible with an augmented reality product configured to continuously project or otherwise display a three-dimensional virtual overlay that corresponds to a current perspective of the three-dimensional marker on top of the three-dimensional marker such that the three-dimensional virtual overlay substantially covers the current perspective of the three-dimensional marker.

The three-dimensional marker may include a plurality of regions that differ from one another. For example, one or more of the plurality of regions may be concave or convex. As another example, each of the plurality of regions may have various dimensions, which may include a corresponding height, width, depth, etc.

The three-dimensional marker may be easily manipulable. Thus, the three-dimensional marker may be light in weight. For example, the three-dimensional marker may be less than two pounds. The three-dimensional marker may be a solid object. Alternatively, the three-dimensional marker may be hollow, enabling the three-dimensional marker to be light in weight and therefore easily manipulable with one hand. The three-dimensional marker may be composed of a material such as glass, plastic or another suitable material that is capable of being detected by an augmented reality product. For example, the material may be substantially opaque. In accordance with various embodiments, the three-dimensional marker may be formed in plastic via a three-dimensional printer.

The three-dimensional marker may be rotatable around one or more axes such that the three-dimensional marker can be viewed from every angle. The three-dimensional marker may be an independent object or may be disposed within another physical object (e.g., shell).

If the physical shape and size of the three-dimensional marker is not optimal for holding in the hand, it may be encased in or otherwise disposed within another physical object such as an optically neutral enclosure. This may enable a user to experience seamless augmented reality in a comfortable form factor. More particularly, the three-dimensional marker may be disposed within a transparent enclosure such as a transparent ball or box. Alternatively, the three-dimensional marker may be disposed within a transparent enclosure that is formed into a shape that mimics the shape of an object being emulated by the three-dimensional virtual overlay. The transparent enclosure may be formed of a material such as transparent glass or a lighter material such as transparent plastic. The transparent enclosure may be a solid enclosure that is integral with the three-dimensional marker. Alternatively, the transparent enclosure may be substantially hollow, enabling the transparent enclosure to add minimal weight to the three-dimensional marker.

The three-dimensional marker or transparent enclosure in which the three-dimensional marker is disposed may be a handheld object. However, a portion of the three-dimensional marker may be occluded when a user holds the three-dimensional marker (or transparent enclosure in which the three-dimensional marker is disposed).

To prevent any portion of the three-dimensional marker from being occluded as a user rotates or otherwise moves the three-dimensional marker, an elongated member such as a handle may be connected to the three-dimensional marker or to a transparent enclosure in which the three-dimensional marker is disposed, enabling a user to rotate or otherwise move the three-dimensional marker via the elongated member. In some embodiments, the three-dimensional marker may include a mechanism for attaching the three-dimensional marker to an elongated member and/or to an enclosure in which the three-dimensional marker is disposed. For example, such a mechanism may include a hole with a locking mechanism that holds the elongated member in place. The locking mechanism may also enable the elongated member to be removed from the locking mechanism. In other embodiments, the elongated member may be permanently attached to the three-dimensional marker or an enclosure in which the three-dimensional marker is disposed. For example, the elongated member and three-dimensional marker (and optionally an enclosure including the three-dimensional marker) may be manufactured as a single structure. As another example, the elongated member may be connected to the three-dimensional marker or enclosure with a fixative. In this manner, an elongated member may be connected or coupled, either temporarily or permanently, to the three-dimensional marker. The elongated member may be composed of an optically neutral material, which may include a transparent material such as glass or plastic. Alternatively, the elongated member may be formed of a metal, non-transparent plastic, or other suitable material The disclosed embodiments may be implemented in a variety of contexts and environments. More particularly, the disclosed embodiments may be implemented in situations where it is desirable to manually manipulate virtual three-dimensional objects. For example, the disclosed embodiments may be applied to assist virtual product presentations, visual prototyping, planning for tasks such as interior design or architecture, games, media experiences, etc. Through the application of the disclosed embodiments, it is possible to manipulate virtual objects without glitches. Such manipulation may include moving the three-dimensional marker (and corresponding virtual object) closer to or farther away from the user and/or turning the three-dimensional marker (and corresponding virtual object) to look at the virtual object from different angles. As a result, it is possible for a user to compare the virtual object to other virtual objects or real objects, test out changes to the design of the virtual object such as scaling or color changes, etc.

In accordance with various embodiments, augmented reality may be implemented using a three-dimensional marker in a network environment. An example system in which various embodiments may be implemented is described in further detail below with reference to FIG. 5.

Example System

Figure 5:
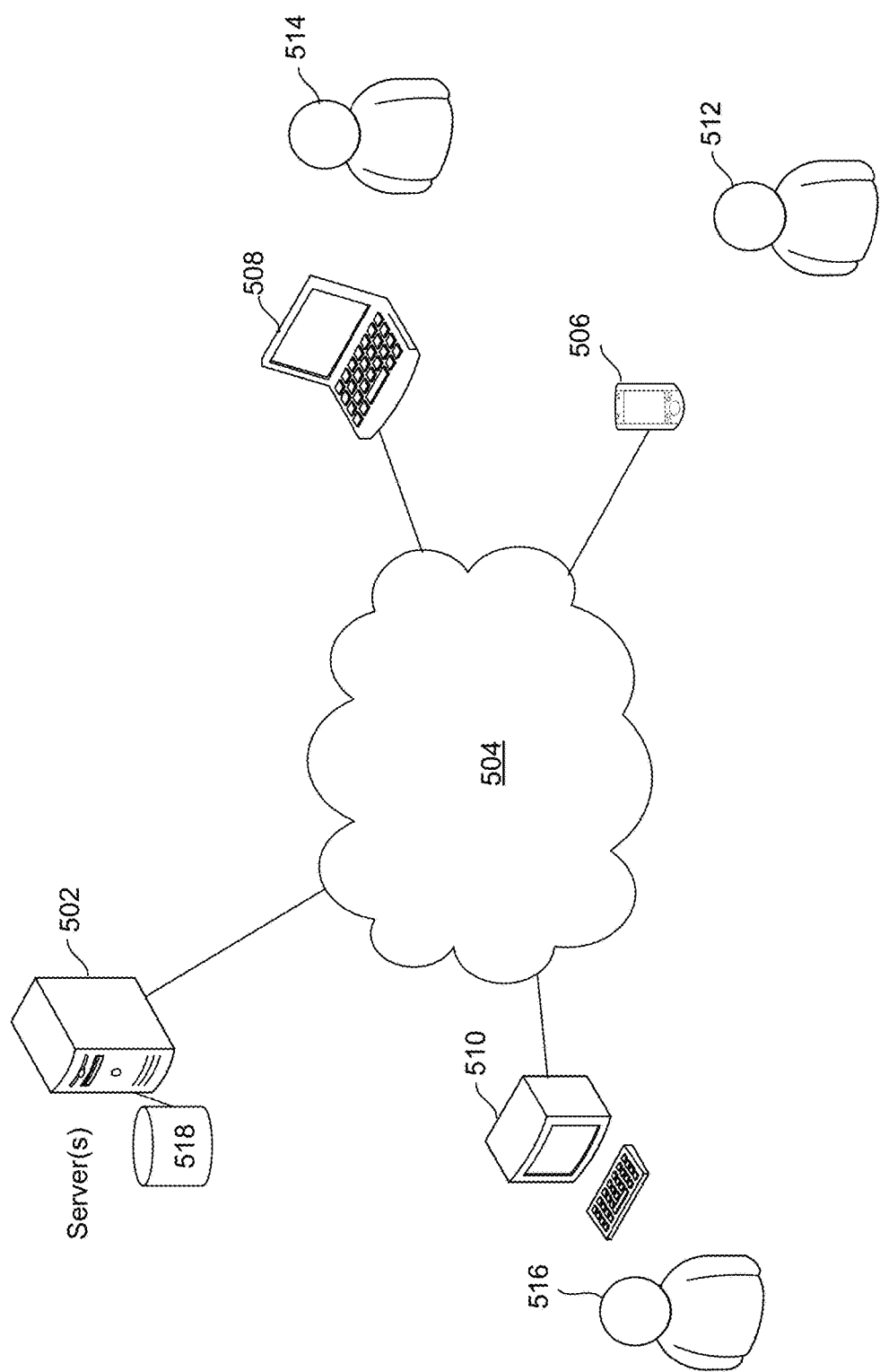
FIG. 5 is a diagram illustrating an example system in which various embodiments may be implemented.

FIG. 5 is a diagram illustrating an example system in which various embodiments may be implemented. As shown in FIG. 5, the system may include one or more servers 502 within a network. In accordance with various embodiments, the servers 502 may be associated with a web site such as a social networking web site. Examples of social networking web sites include Yahoo, Facebook, Tumblr, LinkedIn, Flickr, and Meme. The server(s) 502 may enable the web site to provide a variety of services to its users. More particularly, users of the web site may perform activities such as access user accounts or public user profiles, interact with other members of the web site, transmit messages, upload files (e.g., photographs, videos), purchase goods or services, access information or content posted on the web site, etc.

In this example, the server(s) 502 may obtain or otherwise receive data (e.g., account data and/or user profile) and/or requests (e.g., requests to access the web site, search requests or account requests pertaining to a particular user account). Requests may include requests sent via the Internet 504 from one or more devices 506, 508, 510 in association with corresponding users 512, 514, 516, respectively. The server(s) 502 may personalize content to be provided to users, either automatically or in response to requests.

In addition, the server(s) 502 may support augmented reality for users of augmented reality products. The users may be connected to the web site, or may simply be users of the web site or members of the web site.

The server(s) 502 may have access to one or more data stores 518 that are coupled to the server(s) 502. Each of the data stores 518 may include one or more memories. The data stores 518 may store account information (e.g., data) for a plurality of user accounts, profiles, content, augmented reality applications (e.g., games) including computer-readable instructions, and/or other information supporting augmented reality functionality.

In accordance with various embodiments, the information supporting augmented reality functionality may include one or more sets of data. More particularly, each set of data may be associated with a corresponding three-dimensional marker such that it relates each of a plurality of possible perspectives or associated characteristics of the three-dimensional marker with a corresponding one of a plurality of possible three-dimensional virtual overlays. In addition, the set of data may also relate the various possible perspectives of the three-dimensional marker with one another. For example, the set of data may indicate a shape of the three-dimensional marker. Through the use of such data, it is possible to easily determine a next perspective of the three-dimensional marker and corresponding virtual overlay when there is a movement (e.g., rotation) of the three-dimensional marker from a current perspective of the three-dimensional marker, as detected by an augmented reality product.

The server(s) 102 may transmit a set of data associated with each of one or more three-dimensional markers to a device for application by an augmented reality product. Such transmission may occur, for example, upon purchase of a particular application (e.g., game).

User Profiles and Personalization of Augmented Reality Experience

A profile such as a user profile may be updated under various circumstances. As will be described in further detail below, an enormous amount of information may be collected via web sites based upon various interactions (or lack thereof) of individuals with the content provided via the web sites. For example, the web sites may ascertain whether the individuals access specific content, which may or may not have been recommended by the web sites. As another example, the web sites may record a number of clicks by individuals to various content items. In addition, the user profile may be updated based upon content or applications accessed via a mobile device (e.g., in response to messages or requests transmitted by the mobile device to the server(s)) 502.

Information that is gathered or obtained by the server(s) 502 as well as that received from other device(s), which may include a mobile device, may be stored by the server(s) 502 to the data stores 518. A description of the information that may be stored, maintained, and updated in the data stores 518 will be described in further detail below.

In some embodiments, as an individual interacts with a software application or a device such as a mobile device, descriptive content such as, for example, a date and/or time, may be identified and stored in the data stores 518 such that the descriptive content is stored in association with content. Descriptive content may also be stored along with contextual content. For example, how content such as a content item came to be identified (e.g., it was contained in a particular web page) may be stored in the data stores 518 as contextual content associated with the content. Contextual content, therefore, may identify circumstances surrounding receipt of content (e.g., date or time a content item was received or consumed and/or a source of the content item) and may be associated with descriptive content in the data stores 518. Contextual content, may, for example, be used to subsequently search for associated descriptive content. Accordingly, this additional contextual content and/or descriptive content may enable personalization to be performed based upon the information that is most likely to be relevant.

The data stores 518 may include account information (e.g., data) for a plurality of user accounts. The account information retained in the data stores 518 may include financial information such as credit card information, enabling goods or services provided in association with the account to be purchased. In addition, the account information may include information pertaining to goods or services available to the user via the user account or used by the user. More particularly, the account information may indicate an amount and/or quality of the goods or services available to the user or used by the user. In addition, the account information may indicate a cost associated with the amount and/or quality of goods or services available to the user or used by the user.

The account information may also include or be linked to additional information pertaining to the user. For example, the server(s) 502 may have access to additional user information, which may be retained in one or more user logs stored in the data stores 518. This user information or a portion thereof may be referred to as a user profile. More particularly, the user profile may include public information that is available in a public profile and/or private information. Furthermore, the user profile may include information that has been submitted by the user and/or information that has been deduced or automatically collected by the system (e.g., based upon user action(s)). In accordance with various embodiments, as an individual consumes content provided via a web site or via a device such as a portable device, the user profile may be updated.

A profile builder may initiate generation of a profile, such as for users of an application, including a search engine or messaging application, for example. A profile builder may initiate generation of a user profile for use, for example, by a user, as well as by an entity that may have provided the application. For example, a profile builder may enhance relevance determinations and thereby assist in indexing, searching or ranking search results, as well as assist in the identification of further content to be provided via various media. Therefore, a provider such as a search engine provider may employ a profile builder.

A variety of mechanisms may be implemented to generate and/or update a profile including, but not limited to, collecting or mining navigation history, stored documents, tags, or annotations, to provide a few examples. In addition, the profile may be updated with information gathered as a result of the use of a device such as a portable device. A profile builder may store a generated or updated profile.

The user information retained in the user logs 518 may include personal information such as demographic information and/or geographic information. Examples of demographic information include age and gender. Examples of geographic information include residence address, work address, and/or zip code.

In addition, the user information retained in the user logs 518 may include user preferences. Such user preferences may include augmented reality preferences. The augmented reality preferences may include preferences that pertain to all augmented reality scenarios. In addition, the augmented reality preferences may include preferences that pertain to a particular device, application, and/or three-dimensional marker. For example, the preferences may indicate a preferred or selected three-dimensional virtual overlay. The user preferences may be submitted by the user and/or may be deduced automatically by the system (e.g., based upon user action(s)).

Each time an individual performs online activities such as clicking on a content item (e.g., an advertisement or media item), purchasing goods or services, sending messages, retrieving messages, accessing a media item, posting information or content, or annotating content, information regarding such activity or activities may be retained as user data in the user logs 518. For instance, the user data that is retained in the user logs 518 may indicate the identity of web sites visited, identity of ads or content items that have been selected (e.g., clicked on) via the web site, and/or a timestamp indicating a date and/or time that the individual viewed or accessed the content item. Moreover, where the online publisher supports a search engine (e.g., via the server 502 or a separate search server), information associated with a search query, such as search term(s) of the search query, information indicating characteristics of search results that have been selected (e.g., clicked on) by the individual, and/or associated timestamp may also be retained in the user logs 518. Thus, the information may indicate whether the individual clicked on or viewed a content item and, if so, the number of clicks or views within a particular time period. An individual may be identified in the user logs 518 by a user ID (e.g., user account ID), email address, DNA, fingerprint, information in a user cookie, etc.

Each user profile may be associated with an individual and/or device, which may be identified by a device identifier such as an Internet Protocol (IP) address. Although user profiles are described with reference to data store(s) 518 coupled to the server(s) 502, such a user profile may also be stored, maintained, and/or updated locally at the portable device 506.

Based upon the information recorded in user profiles, it is possible to identify characteristics of items (e.g., content) that may be of interest to individuals (or a similarly situated group of individuals). For example, through the use of user profiles, a web site such as a search engine provider may retrieve annotations, tags, stored pages, navigation history, or the like, which may be useful for making relevance determinations of search results or content.

In some embodiments, a set of data associated with a three-dimensional marker may be personalized. For example, the set of data that is transmitted or applied may be generated or selected based, at least in part, upon a profile of a user using an augmented reality product. This may be accomplished by selecting or generating the set of data (e.g., virtual overlays) based, at least in part, upon the information recorded in a given user profile. The information that is used to select or generate the set of data may include information automatically gathered by the server(s) 502, as well as that explicitly provided by the user.

Explicit and/or deduced user preferences recorded in the user profile may indicate the user's augmented reality preferences. For example, the user preferences may indicate or identify three-dimensional virtual overlays that the user has selected or prefers for use with a particular application and/or three-dimensional marker. As another example, the user preferences may indicate or specify preferred characteristics of a particular three-dimensional overlay.

In addition, explicit and/or deduced interests in the user profile may be applied to various contexts including the augmented reality context. More particularly, content that may be of interest to the user may be incorporated into a three-dimensional virtual overlay. Such content may include media items or advertisements.

The above example refers to a user profile maintained at a network. However, it is important to note that such a user profile or portion thereof may also be maintained locally at a separate device implementing augmented reality functionality. For example, user preferences such as those described herein may be maintained at a device implementing augmented reality functionality. Therefore, the disclosed embodiments may support personalization of an augmented reality experience via a three-dimensional marker according to a user profile maintained at a network and/or maintained locally at the device implementing augmented reality functionality.

Network

A network may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

Content Distribution Network

A distributed system may include a content distribution network. A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. Services may also make use of ancillary technologies including, but not limited to, "cloud computing," distributed storage, DNS request handling, provisioning, signal monitoring and reporting, content targeting, personalization, or business intelligence. A CDN may also enable an entity to operate or manage another's site infrastructure, in whole or in part.

Peer-to-Peer Network

A peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

Wireless Network

A wireless network may couple client devices with a network. A wireless network may employ stand-alone ad-hoc networks, mesh networks, Wireless LAN (WLAN) networks, cellular networks, or the like.

A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Internet Protocol

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6.

The Internet refers to a decentralized global network of networks. The Internet includes LANs, WANs, wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

Social Network

The term "social network" refers generally to a network of individuals, such as acquaintances, friends, family, colleagues, or co-workers, coupled via a communications network or via a variety of sub-networks. Potentially, additional relationships may subsequently be formed as a result of social interaction via the communications network or sub-networks. A social network may be employed, for example, to identify additional connections for a variety of activities, including, but not limited to, dating, job networking, receiving or providing service referrals, content sharing, creating new associations, maintaining existing associations, identifying potential activity partners, performing or supporting commercial transactions, or the like.

A social network may include individuals with similar experiences, opinions, education levels or backgrounds. Subgroups may exist or be created according to user profiles of individuals, for example, in which a subgroup member may belong to multiple subgroups. An individual may also have multiple "1:few" associations within a social network, such as for family, college classmates, or co-workers.

An individual's social network may refer to a set of direct personal relationships or a set of indirect personal relationships. A direct personal relationship refers to a relationship for an individual in which communications may be individual to individual, such as with family members, friends, colleagues, co-workers, or the like. An indirect personal relationship refers to a relationship that may be available to an individual with another individual although no form of individual to individual communication may have taken place, such as a friend of a friend, or the like. Different privileges or permissions may be associated with relationships in a social network. A social network also may generate relationships or connections with entities other than a person, such as companies, brands, or so called 'virtual persons.' An individual's social network may be represented in a variety of forms, such as visually, electronically or functionally. For example, a "social graph" or "socio-gram" may represent an entity in a social network as a node and a relationship as an edge or a link.

Multi-Modal Communication (MMC)

Individuals within one or more social networks may interact or communicate with other members of a social network via a variety of devices. Multi-modal communication technologies refers to a set of technologies that permit interoperable communication across multiple devices or platforms, such as cellphones, smart phones, tablet computing devices, personal computers, televisions, SMS/MMS, email, instant messenger clients, forums, social networking sites (such as Facebook, Twitter, or Google), or the like.

Network Architecture

Figure 6:
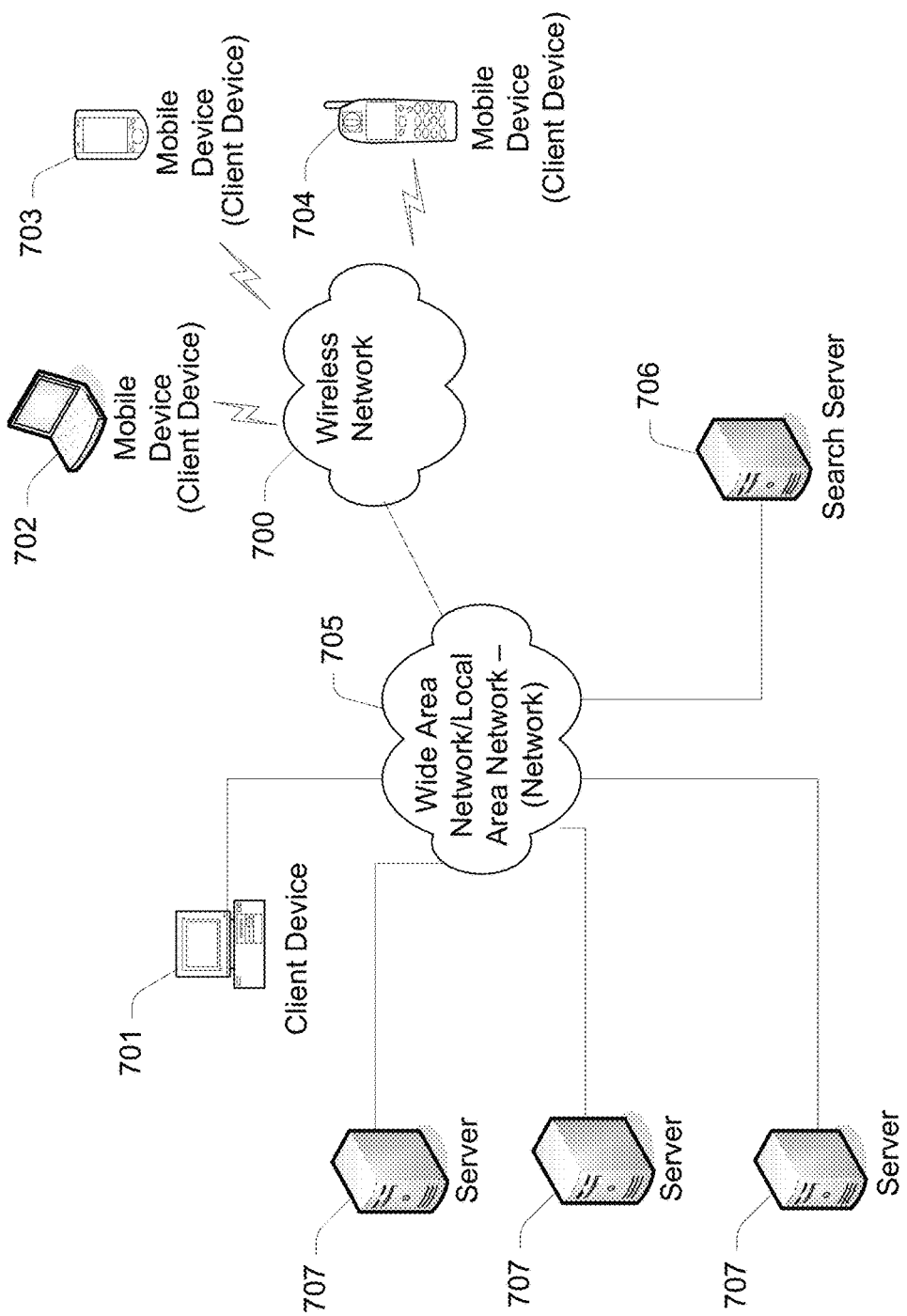
FIG. 6 is a schematic diagram illustrating an example embodiment of a network in which various embodiments may be implemented.

The disclosed embodiments may be implemented in any of a wide variety of computing contexts. FIG. 6 is a schematic diagram illustrating an example embodiment of a network. Other embodiments that may vary, for example, in terms of arrangement or in terms of type of components, are also intended to be included within claimed subject matter. Implementations are contemplated in which users interact with a diverse network environment. As shown, FIG. 6, for example, includes a variety of networks, such as a LAN/WAN 705 and wireless network 700, a variety of devices, such as client devices 701-704, and a variety of servers such as content server(s) 707 and search server 706. The servers may also include an ad server (not shown). As shown in this example, the client devices 701-704 may include one or more mobile devices 702, 703, 704. Client device(s) 701-704 may be implemented, for example, via any type of computer (e.g., desktop, laptop, tablet, etc.), media computing platforms (e.g., cable and satellite set top boxes), handheld computing devices (e.g., PDAs), cell phones, or any other type of computing or communication platform.

The disclosed embodiments may be implemented in some centralized manner. This is represented in FIG. 6 by server(s) 707, which may correspond to multiple distributed devices and data store(s). The server(s) 707 and/or corresponding data store(s) may store user account data, user information, and/or content.

Server

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Content Server

A content server may comprise a device that includes a configuration to provide content via a network to another device. A content server may, for example, host a site, such as a social networking site, examples of which may include, without limitation, Flicker, Twitter, Facebook, LinkedIn, or a personal user site (such as a blog, vlog, online dating site, etc.). A content server may also host a variety of other sites, including, but not limited to business sites, educational sites, dictionary sites, encyclopedia sites, wikis, financial sites, government sites, etc.

A content server may further provide a variety of services that include, but are not limited to, web services, third-party services, audio services, video services, email services, instant messaging (IM) services, SMS services, MMS services, FTP services, voice over IP (VOIP) services, calendaring services, photo services, or the like. Examples of content may include text, images, audio, video, or the like, which may be processed in the form of physical signals, such as electrical signals, for example, or may be stored in memory, as physical states, for example. Examples of devices that may operate as a content server include desktop computers, multiprocessor systems, microprocessor-type or programmable consumer electronics, etc.

Crawler

A crawler may be operable to communicate with a variety of content servers, typically via a network. In some embodiments, a crawler starts with a list of URLs to visit. The list may be called a seed list. As the crawler visits the URLs in the seed list, it identifies all the hyperlinks in the page and adds them to a list of URLs to visit, called the crawl frontier. URLs from the crawler frontier are recursively visited according to a set of policies. A crawler typically retrieves files by generating a copy for storage, such as local cache storage. A cache refers to a persistent storage device. A crawler may likewise follow links, such as HTTP hyperlinks, in the retrieved file to additional files and may retrieve those files by generating copy for storage, and so forth. A crawler may therefore retrieve files from a plurality of content servers as it "crawls" across a network.

Client Device

Figure 7:
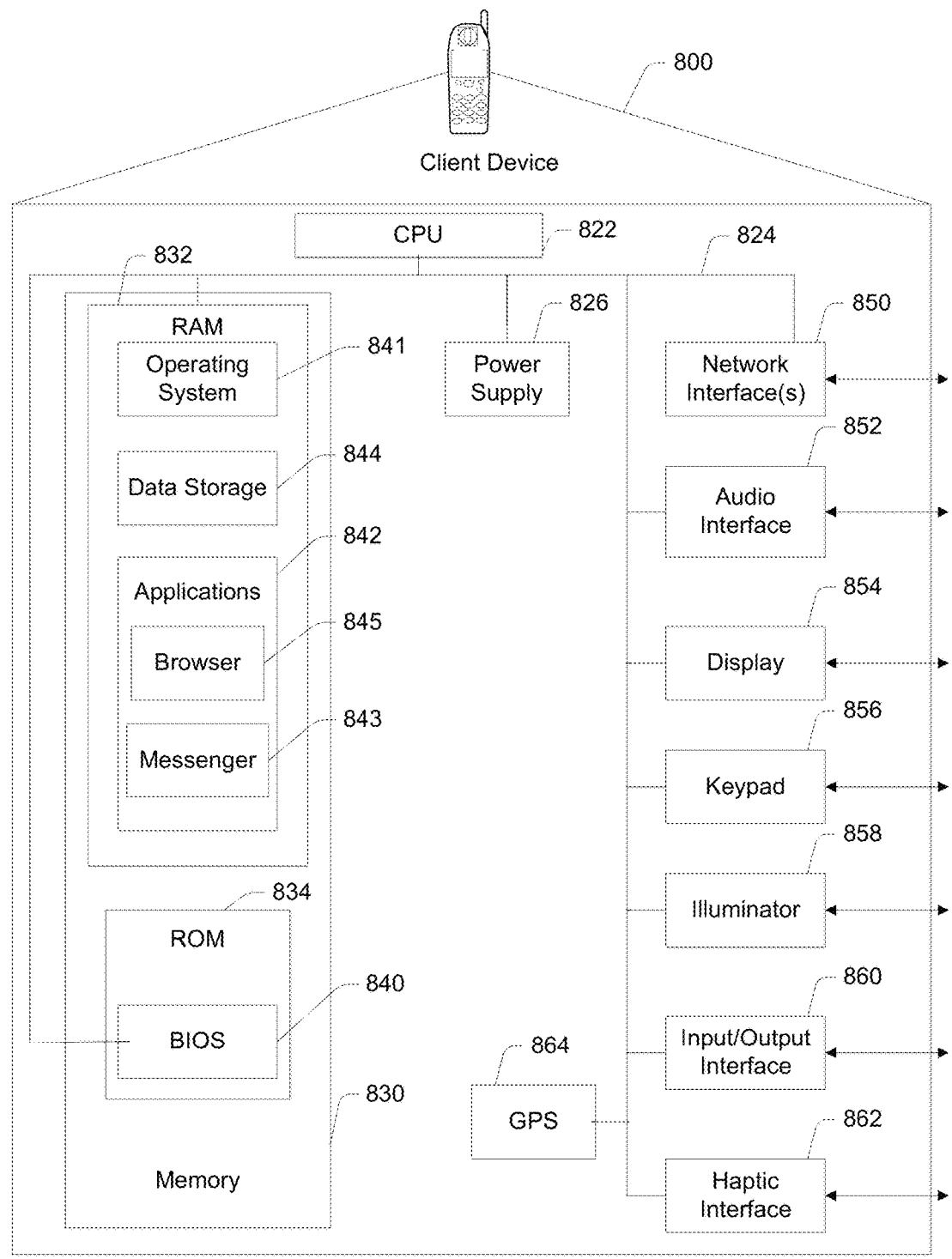
FIG. 7 is a schematic diagram illustrating an example client device in which various embodiments may be implemented.

FIG. 7 is a schematic diagram illustrating an example embodiment of a client device in which various embodiments may be implemented. A client device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like. A portable device may also be referred to as a mobile device or handheld device.

As shown in this example, a client device 800 may include one or more central processing units (CPUs) 822, which may be coupled via connection 824 to a power supply 826 and a memory 830. The memory 830 may include random access memory (RAM) 832 and read only memory (ROM) 834. The ROM 834 may include a basic input/output system (BIOS) 840.

The RAM 832 may include an operating system 841. More particularly, a client device may include or may execute a variety of operating systems, including a personal computer operating system, such as a Windows, iOS or Linux, or a mobile operating system, such as iOS, Android, or Windows Mobile, or the like. The client device 800 may also include or may execute a variety of possible applications 842 (shown in RAM 832), such as a client software application such as messenger 843, enabling communication with other devices, such as communicating one or more messages, such as via email, short message service (SMS), or multimedia message service (MMS), including via a network, such as a social network, including, for example, Facebook, LinkedIn, Twitter, Flickr, or Google, to provide only a few possible examples. The client device 800 may also include or execute an application to communicate content, such as, for example, textual content, multimedia content, or the like, which may be stored in data storage 844. A client device may also include or execute an application such as a browser 845 to perform a variety of possible tasks, such as browsing, searching, playing various forms of content, including locally stored or streamed video, or games (such as fantasy sports leagues).

The client device 800 may send or receive signals via one or more interface(s). As shown in this example, the client device 800 may include one or more network interfaces 850. The client device 800 may include an audio interface 852. In addition, the client device 800 may include a display 854 and an illuminator 858. The client device 800 may further include an Input/Output interface 860, as well as a Haptic Interface 862 supporting tactile feedback technology.

The client device 800 may transmit and detect patterns, images, or signals such as infra-red signals via the interface(s). For example, the client device 800 may transmit an infra-red blink pattern, as well as detect an infra-red blink pattern, as described herein.

The client device 800 may vary in terms of capabilities or features. Claimed subject matter is intended to cover a wide range of potential variations. For example, a cell phone may include a keypad such 856 such as a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) 864 or other location identifying type capability, or a display with a high degree of functionality, such as a touch-sensitive color two-dimensional or three-dimensional display, for example. The foregoing is provided to illustrate that claimed subject matter is intended to include a wide range of possible features or capabilities.

According to various embodiments, input may be obtained using a wide variety of techniques. For example, input for downloading or launching an application may be obtained via a graphical user interface from a user's interaction with a local application such as a mobile application on a mobile device, web site or web-based application or service and may be accomplished using any of a variety of well-known mechanisms for obtaining information from a user. However, it should be understood that such methods of obtaining input from a user are merely examples and that input may be obtained in many other ways.

Figure 8:
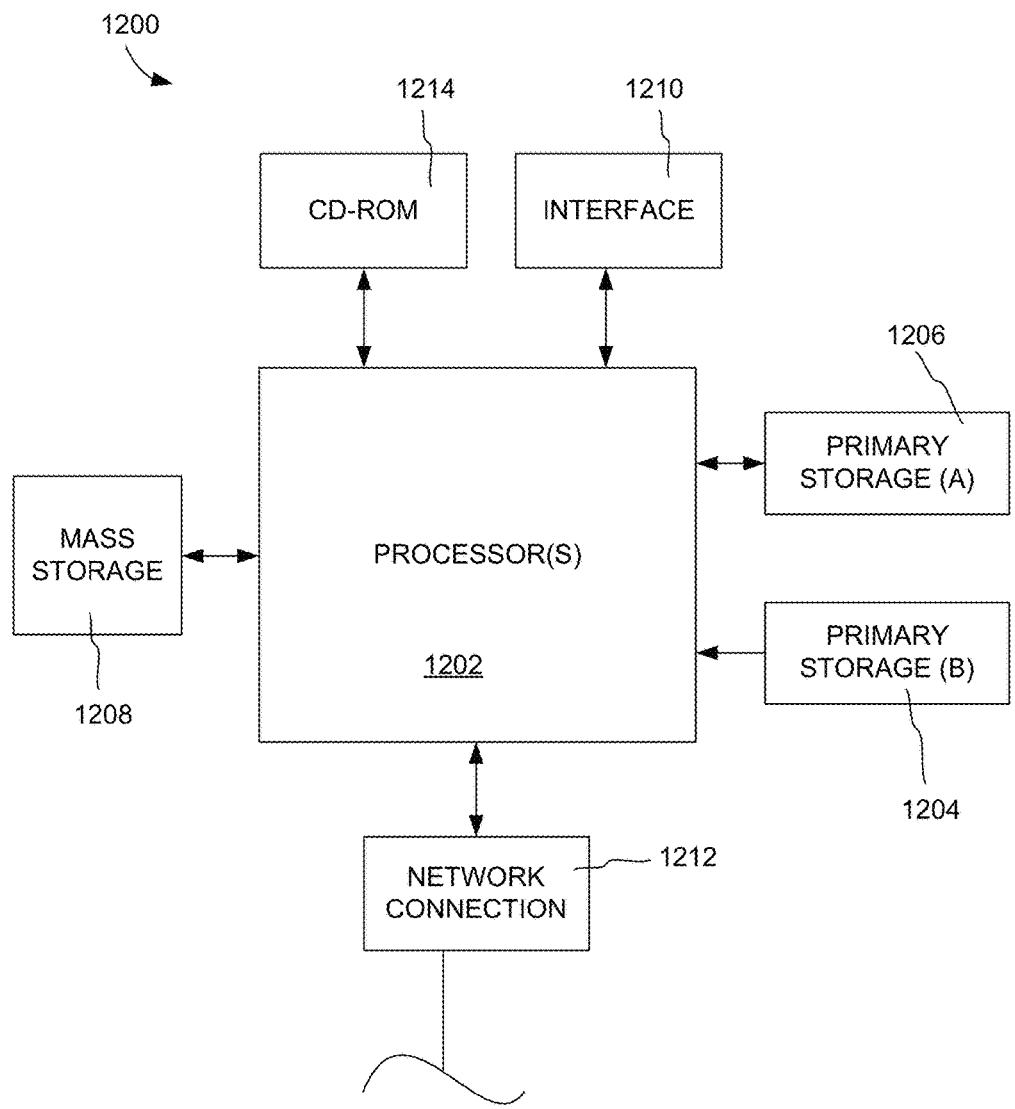
FIG. 8 is a schematic diagram illustrating an example computer system in which various embodiments may be implemented.

FIG. 8 illustrates a typical computer system that, when appropriately configured or designed, can serve as a system via which various embodiments may be implemented. The computer system 1200 includes any number of CPUs 1202 that are coupled to storage devices including primary storage 1206 (typically a RAM), primary storage 1204 (typically a ROM). CPU 1202 may be of various types including microcontrollers and microprocessors such as programmable devices (e.g., CPLDs and FPGAs) and unprogrammable devices such as gate array ASICs or general purpose microprocessors. As is well known in the art, primary storage 1204 acts to transfer data and instructions uni-directionally to the CPU and primary storage 1206 is used typically to transfer data and instructions in a bi-directional manner. Both of these primary storage devices may include any suitable computer-readable media such as those described above. A mass storage device 1208 is also coupled bi-directionally to CPU 1202 and provides additional data storage capacity and may include any of the computer-readable media described above. Mass storage device 1208 may be used to store programs, data and the like and is typically a secondary storage medium such as a hard disk. It will be appreciated that the information retained within the mass storage device 1208, may, in appropriate cases, be incorporated in standard fashion as part of primary storage 1206 as virtual memory. A specific mass storage device such as a CD-ROM 1214 may also pass data uni-directionally to the CPU.

CPU 1202 may also be coupled to an interface 1210 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1202 optionally may be coupled to an external device such as a database or a computer or telecommunications network using an external connection as shown generally at 1212. With such a connection, it is contemplated that the CPU might receive information from the network, or might output information to the network in the course of performing the method steps described herein.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store instructions for performing the disclosed methods, graphical user interfaces to be displayed in association with the disclosed methods, etc.

Because such information and program instructions may be employed to implement the systems/methods described herein, the disclosed embodiments relate to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as ROM and RAM. Examples of program instructions include both machine code, such as produced by a compiler, and files containing higher level code that may be executed by the computer using an interpreter.

Computer program instructions with which various embodiments are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

The disclosed techniques may be implemented in any suitable combination of software and/or hardware system, such as a web-based server or desktop computer system. Moreover, a system implementing various embodiments may be a portable device, such as a laptop or cell phone. An apparatus and/or web browser may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the disclosed method steps.

Although the foregoing embodiments have been described in some detail for purposes of clarity of understanding, it will be apparent that certain changes and modifications may be practiced within the scope of the appended claims. Therefore, the present embodiments are to be considered as illustrative and not restrictive, and are not to be limited to the details given herein, but may be modified within the scope and equivalents of the appended claims.

What is claimed is:

1. An apparatus, comprising:
   a processor; and
   a memory, at least one of the processor or the memory being adapted for:
     detecting a change in perspective of a three-dimensional marker to a first perspective, the three-dimensional marker having a shape that presents a different appearance from every angle;
     identifying or generating a first three-dimensional virtual overlay corresponding to the first perspective of the three-dimensional marker; and
     projecting or displaying the first three-dimensional virtual overlay corresponding to the first perspective of the three-dimensional marker such that the first three-dimensional virtual overlay substantially covers the first perspective of the three-dimensional marker.

2. The apparatus as recited in claim 1, at least one of the processor or the memory being adapted for performing operations, further comprising:
   generating a first depth map corresponding to the first perspective of the three-dimensional marker;
   wherein the first three-dimensional virtual overlay is identified or generated based, at least in part, upon the first depth map.

3. The apparatus as recited in claim 1, at least one of the processor or the memory being adapted for performing operations, further comprising:
   continuously tracking the three-dimensional marker.

4. The apparatus as recited in claim 1, at least one of the processor or the memory being adapted for performing operations, further comprising:
   detecting a second perspective of the three-dimensional marker;
   identifying or generating a second three-dimensional virtual overlay corresponding to the second perspective of the three-dimensional marker; and
   projecting or displaying the second three-dimensional virtual overlay corresponding to the second perspective of the three-dimensional marker such that the second three-dimensional virtual overlay substantially covers the second perspective of the three-dimensional marker.

5. The apparatus as recited in claim 4, wherein the first three-dimensional virtual overlay represents a first object and the second three-dimensional virtual overlay represents a second object that is different from the first object.

6. The apparatus as recited in claim 4, wherein the first three-dimensional virtual overlay represents a first object from the first perspective and the second three-dimensional virtual overlay represents the first object from the second perspective.

7. A non-transitory computer-readable medium storing thereon computer-readable instructions, comprising:
   instructions for detecting a change in perspective of a three-dimensional marker to a first perspective via an augmented reality product, the three-dimensional marker having a shape that presents a different appearance from every angle;
   instructions for identifying or generating a first three-dimensional virtual overlay corresponding to the first perspective of the three-dimensional marker; and
   instructions for presenting the first three-dimensional virtual overlay corresponding to the first perspective of the three-dimensional marker via the augmented reality product such that the first three-dimensional virtual overlay substantially covers the first perspective of the three-dimensional marker.

8. The non-transitory computer-readable medium as recited in claim 7, further comprising:
   instructions for generating a first depth map corresponding to the first perspective of the three-dimensional marker;
   wherein the first three-dimensional virtual overlay is identified or generated based, at least in part, upon the first depth map.

9. The non-transitory computer-readable medium as recited in claim 7, further comprising:
   instructions for continuously tracking the three-dimensional marker.

10. The non-transitory computer-readable medium as recited in claim 7, further comprising:
    instructions for detecting a second perspective of the three-dimensional marker;
    instructions for identifying or generating a second three-dimensional virtual overlay corresponding to the second perspective of the three-dimensional marker; and
    instructions projecting or displaying the second three-dimensional virtual overlay corresponding to the second perspective of the three-dimensional marker such that the second three-dimensional virtual overlay substantially covers the second perspective of the three-dimensional marker.

11. The non-transitory computer-readable medium as recited in claim 10, wherein the first three-dimensional virtual overlay represents a first object and the second three-dimensional virtual overlay represents a second object that is different from the first object.

12. The non-transitory computer-readable medium as recited in claim 10, wherein the first three-dimensional virtual overlay represents a first object from the first perspective and the second three-dimensional virtual overlay represents the first object from the second perspective.

13. An apparatus, comprising:
    a three-dimensional object, the three-dimensional object having a shape that presents a different appearance from every angle;

wherein the three-dimensional object operates as a three-dimensional marker capable of being detected by an augmented reality product, wherein the augmented reality product is configured to detect a change in perspective of the three-dimensional object and project or display a three-dimensional virtual overlay that corresponds to a current perspective of the three-dimensional object such that the three-dimensional virtual overlay substantially covers the current perspective of the three-dimensional object.

14. The apparatus as recited in claim 13, further comprising:
a transparent enclosure that includes the three-dimensional object.

15. The apparatus as recited in claim 13, wherein the three-dimensional object comprises a handheld object that is composed of a solid material.

16. The apparatus as recited in claim 13, wherein at least a portion of the three-dimensional object is substantially hollow.

17. The apparatus as recited in claim 13, wherein at least a portion of the three-dimensional object is composed of a material that is substantially opaque.

18. The apparatus as recited in claim 13, further comprising:
a mechanism for attaching the three-dimensional object to an elongated member.

19. The apparatus as recited in claim 13, further comprising:
an elongated member connected to the three-dimensional object.

20. The apparatus as recited in claim 13, wherein the three-dimensional object is rotatable around one or more axes such that the three-dimensional object can be viewed from every angle.

21. The apparatus as recited in claim 1, wherein the three-dimensional marker does not have two dimensional images affixed thereto.

22. The apparatus as recited in claim 13, wherein the three-dimensional object does not have two dimensional images affixed thereto.

* * * * *